United States Patent
Xia et al.

(10) Patent No.: US 10,766,208 B2
(45) Date of Patent: Sep. 8, 2020

(54) ELECTRONIC DEVICE AND INFORMATION PROCESSING METHOD

(71) Applicants: Beijing Lenovo Software Ltd., Beijing (CN); Lenovo (Beijing) Co., Ltd., Beijing (CN)

(72) Inventors: Jie Xia, Beijing (CN); Xiaotian Zhu, Beijing (CN); Yan Gao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 597 days.

(21) Appl. No.: 14/757,412

(22) Filed: Dec. 23, 2015

(65) Prior Publication Data
US 2017/0090579 A1    Mar. 30, 2017

(30) Foreign Application Priority Data
Sep. 30, 2015    (CN) .......................... 2015 1 0642926

(51) Int. Cl.
*B29C 70/20*     (2006.01)
*G06F 3/00*      (2006.01)
*G06F 3/01*      (2006.01)
*G06F 3/0485*    (2013.01)
(Continued)

(52) U.S. Cl.
CPC .............. *B29C 70/20* (2013.01); *G06F 1/163* (2013.01); *G06F 1/1694* (2013.01); *G06F 3/00* (2013.01); *G06F 3/017* (2013.01); *G06F 3/0485* (2013.01); *B29C 2793/0081* (2013.01);
(Continued)

(58) Field of Classification Search
CPC .... G06F 1/163; G06F 3/04842; G06F 1/1652; G06F 1/1641; G06F 2200/1637; G06F 2203/04102; G06F 2203/04803; G06F 17/00; G09F 9/301; Y02D 10/153; G09G 2310/04; B29C 67/0088; B29C 70/20; B29C 2793/0081; B29L 2009/00; A61B 5/681; A61B 5/7445; A61B 5/743; A61B 5/117
See application file for complete search history.

(56) References Cited

U.S. PATENT DOCUMENTS

2013/0222271 A1* 8/2013 Alberth ................... G06F 1/163
                                                         345/173
2015/0123896 A1* 5/2015 Tamaki ..................... G09G 3/20
                                                         345/156
(Continued)

*Primary Examiner* — Amit Chatly
(74) *Attorney, Agent, or Firm* — Harness, Dickey & Pierce, P.L.C.

(57) ABSTRACT

An electronic device and an information processing method are provided. The electronic device includes: a maintaining body configured to maintain a relative position relationship between the electronic device and the at least one part of the body of the user in a case that the electronic device is in a maintained state; a display connected to the maintaining body and including at least two display regions; a first sensor configured to sense a motion parameter of the at least one part of the body in a case that the at least one part of the body of the user moves; and a processor configured to determine a motion state of the at least one part of the body based on the motion parameter and adjust a display mode of the display based on the motion state according to a first adjusting strategy.

9 Claims, 13 Drawing Sheets

(51) Int. Cl.
*G06F 1/16* (2006.01)
*B29L 9/00* (2006.01)

(52) U.S. Cl.
CPC .. *B29L 2009/00* (2013.01); *G09G 2340/0464* (2013.01); *G09G 2340/14* (2013.01); *G09G 2380/02* (2013.01)

(56) References Cited

U.S. PATENT DOCUMENTS

2015/0223355 A1* 8/2015 Fleck ................... G06F 1/163
 361/679.03
2016/0357420 A1* 12/2016 Wilson ............... G06F 3/04847

* cited by examiner

US 10,766,208 B2

ELECTRONIC DEVICE AND INFORMATION PROCESSING METHOD

CROSS REFERENCE TO RELATED APPLICATIONS

The present application claims the priority to Chinese Patent Application No. 201510642926.5, titled "ELECTRONIC DEVICE AND INFORMATION PROCESSING METHOD", filed on Sep. 30, 2015 with the State Intellectual Property Office of People's Republic of China, the content of which is incorporated herein by reference.

FIELD

The present disclosure relates to the technical field of electronics, and in particular to an electronic device and an information processing method.

BACKGROUND

Generally a wearable device has a small volume, for which a large touch screen similar to that of a tablet computer or many keys similar to that of a keyboard cannot be provided. Therefore, a user controls the wearable device or controls other electronic devices via the wearable device by moving at least one part of a body of the user. For example, the user rotates a wrist on which a smart watch is worn.

The user can determine whether a motion of the user is obtained by the wearable electronic device by observing whether the wearable device or other electronic devices make a response in a case that the motion of the at least one part is finished. The user cannot determine whether the motion of the at least one part of the body of the user is valid for the electronic device during a motion process. In other words, the conventional wearable device cannot prompt the user regarding whether the motion of the at least one part is obtained by the electronic device.

SUMMARY

An electronic device and an information processing method are provided according to embodiments of the present disclosure, which are used to adjust a display mode of a display based on a motion state, such that a user determines that a motion of at least one part of a body of the user is obtained by the electronic device.

In a first aspect, an electronic device is provided according to the present disclosure, which includes:

a maintaining body configured to maintain a relative position relationship between the electronic device and at least one part of a body of a user in a case that the electronic device is in a maintained state;

a display connected to the maintaining body and including at least two display regions, where illumination spaces for the at least two display regions do not overlap in a case that the display is in a curved posture;

a first sensor configured to sense a motion parameter of the at least one part of the body in a case that the at least one part of the user moves; and a processor connected to the first sensor and the display, where the processor is configured to determine a motion state of the at least one part of the body based on the motion parameter and adjust a display mode of the display based on the motion state according to a first adjusting strategy, and the user determines that the motion of the at least one part of the body is obtained by the electronic device.

Optionally, the electronic device may further include:

a second sensor connected to the processor and configured to sense a visual field parameter of the user, where the processor is configured to receive the visual field parameter; determine a visual field range of the user based on the visual field parameter; and adjust a display mode of a first display region based on the motion state and the visual field range according to the first adjusting strategy, and the first display region is a display region of the at least two display regions in the visual field range after the at least one part of the body moves.

Optionally, the processor may be configured to determine, based on the visual field range, that the display region in the visual field range is switched from a second display region to the first display region, and the second display region is outside the visual field range in a case that the first display region is in the visual field range; and the processor may be configured to adjust, based on the motion state, a second display content in the second display region to obtain a first display content; and display the first display content in the first display region.

Optionally, the processor may be configured to adjust a display mode of the at least two display regions based on the motion state, and the user determines, based on the display mode of any of the at least two display regions in the visual field range, that the motion of the at least one part of the body is obtained by the electronic device.

Optionally, the maintaining body may be capable of functioning as at least one portion of a ring or at least one portion of an approximate ring meeting a first preset condition, and the ring or the approximate ring may be capable of surrounding a columnar object meeting a second preset condition.

Optionally, the first sensor may be configured to sense a parameter for the rotation of the electronic device around an axis of the ring or an approximate axis of the approximate ring.

Optionally, the processor may be further configured to generate a control instruction based on the motion state, and the control instruction may be used to control the electronic device or the control instruction may be transmitted to another electronic device via a communicator connected to the processor.

Optionally, the maintaining body may be configured to control the electronic device to be in the maintained state or a non-maintained state, and a state of the electronic device is capable of being switched between the maintained state and the non-maintained state;

in a case that the electronic device is in the non-maintained state, the relative position relationship between the electronic device and the at least one part of the body of the user is not maintained, the display is in a flat posture different from the curved posture, and the illumination spaces for the at least two display regions overlap; and a gesture of the display is capable of being switched between the curved posture and the flat posture.

In a second aspect, an information processing method is provided, which includes:

maintaining a relative position relationship between an electronic device and at least one part of a body of a user via a maintaining body of the electronic device in a case that the electronic device is in a maintained state, and sensing a motion parameter of the at least one part in a case that the at least one part of the body of the user moves;

determining a motion state of the at least one part of the body based on the motion parameter; and adjusting a display mode of a display of the electronic device based on the motion state according to a first adjusting strategy, where the user determines that a motion of the at least one part of the body is obtained by the electronic device, where the display is connected to the maintaining body and includes at least two display regions; and illumination spaces for the at least two display regions do not overlap in a case that the display is in a curved posture.

Optionally, before the adjusting a display mode of a display of the electronic device based on the motion state according to a first adjusting strategy, the method may further include:

sensing a visual field parameter of the user;

where the adjusting a display mode of a display of the electronic device based on the motion state according to a first adjusting strategy may include:

determining a visual field range of the user based on the visual field parameter; and adjusting a display mode of a first display region based on the motion state and the visual field range according to a first adjusting strategy, where the first display region is a display region of the at least two display regions in the visual field range after the at least one part of the body of the user moves.

Optionally, the adjusting a display mode of a first display region based on the motion state and the visual field range according to a first adjusting strategy may include:

determining, based on the visual field range, that the display region in the visual filed range is switched from a second display region to the first display region, where the second display region is outside the visual field range in a case that the first display region is in the visual field range;

adjusting, based on the motion state, a second display content in the second display region to obtain a first display content; and displaying the first display content in the first display region.

Optionally, the adjusting a display mode of a display of the electronic device based on the motion state according to a first adjusting strategy may include:

adjusting a display mode of the at least two display regions based on the motion state, where the user determines, based on the display mode of any of the at least two display regions in the visual field range, that a motion of the at least one part of the body is obtained by the electronic device.

Optionally, the sensing a visual field parameter of the user may include:

sensing a parameter for the rotation of the electronic device around an axis of the ring or an approximate axis of the approximate ring, where the maintaining body is capable of functioning as at least one portion of the ring or at least one portion of the approximate ring meeting a first preset condition, and the ring or the approximate ring is capable of surrounding a columnar object meeting a second preset condition.

Optionally, after the determining a motion state of the at least one part based on the motion parameter, the method may further include:

generating a control instruction based on the motion state, where the control instruction may be used to control the electronic device or the control instruction may be transmitted to another electronic device via a communicator connected to the processor.

In a third aspect, an electronic device is provided according to the present disclosure, which includes:

a first sensing unit configured to maintain a relative position relationship between the electronic device and at least one part of a body of a user in a case that the electronic device is in a maintained state, and sense a motion parameter of the at least one part of the body in a case that the at least one part of the body of the user moves;

a first determining unit configured to determine a motion state of the at least one part of the body based on the motion parameter; and an adjusting unit configured to adjust a display mode of a display of the electronic device based on the motion state according to a first adjusting strategy, where the user determines that a motion of the at least one part of the body is obtained by the electronic device, where the display is connected to the maintaining body and includes at least two display regions; and illumination spaces for the at least two display regions do not overlap in a case that the display is in a curved posture.

Optionally, the electronic device may further include:

a second sensing unit configured to sense a visual field parameter of the user, where the adjusting unit is configured to determine a visual field range of the user based on the visual field parameter; and adjust a display mode of a first display region based on the motion state and the visual field range according to a first adjusting strategy, where the first display region is a display region of the at least two display regions in the visual field range after the at least one part of the body of the user moves.

Optionally, the adjusting unit is configured to determine, based on the visual field range, the display region in the visual field range is switched from a second display region to the first display region, where the second display region is outside the visual field range in a case that the first display region is in the visual field range; adjust, based on the motion state, a second display content in the second display region to obtain a first display content; and display the first display content in the first display region.

Optionally, the adjusting unit may be configured to adjust a display mode of the at least two display regions based on the motion state, where the user determines, based on the display mode of any of the at least two display regions in the visual field range, that a motion of the at least one part of the body is obtained by the electronic device.

Optionally, the second sensing unit may be configured to sense a parameter for the rotation of the electronic device around an axis of the ring or an approximate axis of the approximate ring, where the maintaining body is capable of functioning as at least one portion of the ring or at least one portion of the approximate ring meeting a first preset condition, and the ring or the approximate ring is capable of surrounding a columnar object meeting a second preset condition.

Optionally, the electronic device may further include:

an instruction generating unit configured to generate a control instruction based on a motion state in a case that the motion state of the at least one part is determined based on the motion parameter, where the control instruction may be used to control the electronic device or the control instruction may be transmitted to another electronic device via a communicator connected to the processor.

DETAILED DESCRIPTION OF THE EMBODIMENTS

Figure 1:
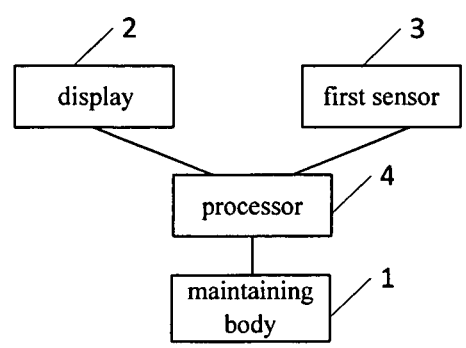
FIG. 1 is a schematic structural diagram of an electronic device according to an embodiment of the present disclosure.

An electronic device and an information processing method are provided according to embodiments of the present disclosure, which are used to adjust a display mode of a display based on a motion state, such that a user determines whether a motion of at least one part of a body of the user is obtained by the electronic device.

In technical solutions of embodiments of the present disclosure, the electronic device includes a maintaining body, a display, a first sensor and a processor. The maintaining body is configured to maintain a relative position relationship between the electronic device and at least one part of a body of a user in a case that the electronic device is in a maintained state. The display is connected to the maintaining body and includes at least two display regions. Illumination spaces for the at least two display regions do not overlap in a case that the display is in a curved posture. The first sensor is configured to sense a motion parameter of the at least one part in a case that the at least one part of the body of the user moves. The processor is connected to the first sensor and the display, and configured to determine a motion state of the at least one part of the body based on the motion parameter, and adjust a display mode of the display based on the motion state according to a first adjusting strategy, and the user determines that a motion of the at least one part of the body is obtained by the electronic device. Therefore, in a case that the motion of the at least one part of the body of the user is obtained by the electronic device, the processor adjusts the display mode of the display according to the first adjusting strategy, and indicates to the user that the motion of the user is obtained by the electronic device. In a case the at least one part of the body of the user moves, the user can determine whether the motion of the user is obtained by the electronic device and determine whether the motion is valid by observing the display mode of the display, and thus the user continues moving or moves the at least one part of the body again in a timely manner.

Hereinafter the technical solutions of the present disclosure are described in detail in conjunction with the drawings and specific embodiments. It should be understood that the embodiments of the present disclosure and specific features in the embodiments are used to describe the technical solutions of the present disclosure in detail, but not limiting the technical solutions of the present disclosure. The embodiments of the present disclosure and the technical features in the embodiments may be combined each other without a conflict.

The term "and/or" herein only describes an association between associated objects and indicates that there are three types of relationship. For example, A and/or B may indicate that: only A exists, both A and B exist, and only B exists. In addition, a character "I" herein generally indicates a relationship of "or" between associated objects.

Figure 2:
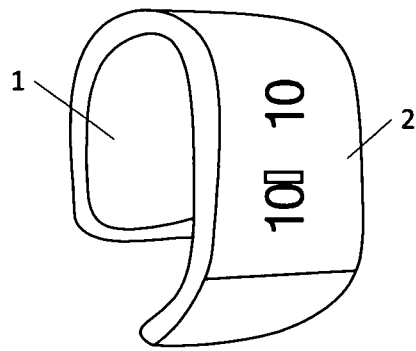
FIG. 2 is a schematic diagram of an appearance of an electronic device according to an embodiment of the present disclosure.

As shown in FIG. 1 and FIG. 2, an electronic device is provided according to a first aspect of the present disclosure, which includes a maintaining body 1, a display 2, a first sensor 3 and a processor 4.

In an embodiment of the present disclosure, a user wears the electronic device on at least one part of a body via the maintaining body 1. In a case that the electronic device is worn on the at least one part of the body of the user, the electronic device is in a maintained state. In a case that the electronic device is in the maintained state, the maintaining body 1 is configured to maintain a relative position relationship between the electronic device and the at least one part of the body of the user. In the embodiment of the present disclosure, the maintaining a relative position relationship between the electronic device and the at least one part of the body of the user indicates that the relative position relationship between the electronic device and the at least one part of the body of the user does not change or changes slightly. For example, in a case that the electronic device is worn on a head of the user, the maintaining body 1 controls the electronic device not to fall off from the head.

During a specific implementation process, a property parameter of the maintaining body 1 has to match a body parameter of the user. For example, in a case that the electronic device is to be maintained on a wrist of the user, an effective circumference of the maintaining body 1 around the wrist is greater than or equal to a circumference of the wrist. If the circumference of the wrist is generally between 13 cm and 17 cm, the effective circumference of the maintaining body 1 is at least 17 cm. Alternatively, in a case that the electronic device is to be maintained on the head of the user and a circumference of a forehead of an adult is between 54 cm and 58 cm, hence a circumference of the maintaining body 1 may be 58 cm or 59 cm.

For example, a shape of the wrist of the body is approximately elliptical, and a distance in a direction from a palm to a back of a hand is less than a distance in a direction from a thumb to a little finger. In order to enable the maintaining body 1 to fit the wrist, the shape of the maintaining body 1 may be set to be elliptical or approximately elliptical, and a long axis and a short axis of the maintaining body are set based on an ergonomics parameter. Those skilled in the art may set the maintaining body based on actual needs, which is not limited in the present disclosure.

The display 2 is connected to the maintaining body 1. During a specific implementation process, the display 2 may be sheathed on the maintaining body 1; in a case that the display 2 is sheathed fixedly on the maintaining body 1, the display 2 cannot move on the maintaining body 1; or in a case that the display 2 is sheathed non-fixedly on the maintaining body 1, the display 2 may slide on the maintaining body 1. In addition, during a specific implementation process, the maintaining body 1 may be connected to a first end and a second end opposite to the first end of the display 2. Those skilled in the art may set a connection way between the display and the maintaining body, which is not limited in the present disclosure.

The display 2 according to the embodiment of the present disclosure includes at least two display regions, for example, the number of the at least two display region may be three, two or four, which is not limited in the present disclosure. Those skilled in the art should understand that, the at least two display regions in the embodiment of the present disclosure may not be display regions including at least two sub-displays independently physically, may be at least two display regions logically divided from the same display; or a region which the user can see is taken as one display region and a region which the user cannot see is taken as another display region.

Figure 3:
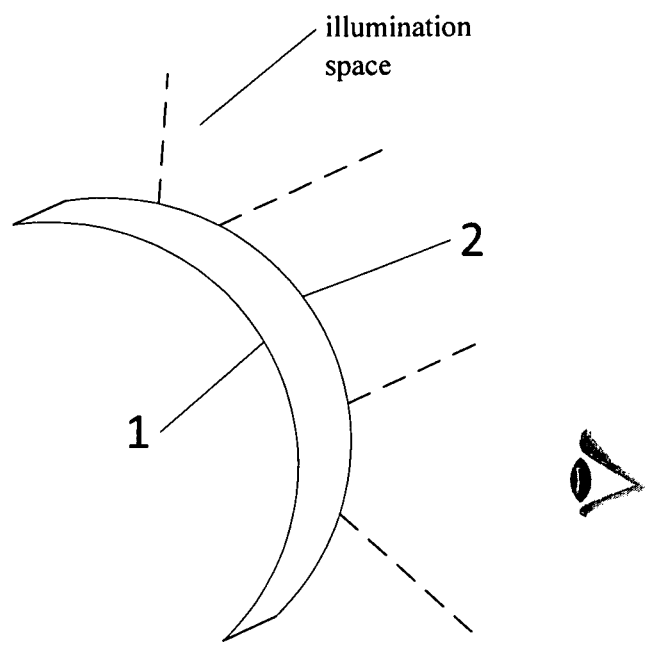
FIG. 3 is a side view of a display being in a curved posture and a schematic diagram of an illumination space according to an embodiment of the present disclosure.

The display 2 is in a curved posture, as shown in FIG. 2 to FIG. 13*b*. In a case that the display 2 is in the curved posture, illumination spaces for the display regions do not overlap. Specifically, the display 2 emits a light based on a content to be displayed, the light emitted from the display 2 enters an eye of the user, and the user sees the display content. An illumination space for a display region refers to a space which can be illuminated by the light emitted from the display region. If the eye of the user is in the illumination space for the display region, the light emitted from the display region can enter the eye of the user. In other words, if the eye of the user is in the illumination space for the display region, the user can see the content displayed in the display region. As shown in FIG. 3, in a case that the display 2 is in the curved posture, illumination spaces for the display regions do not overlap in the embodiment of the present disclosure. In a case that the display is in the curved posture and the eye of the user is stationary, the user cannot see all the display regions.

The processor 4 is connected to the first sensor 3 and the display 2. In the embodiment of the present disclosure, the processor 4 may be arranged on the maintaining body 1 or inside the display 2. The first sensor 3 may be arranged on the maintaining body 1 or inside the display 2. Those skilled in the art may set the arrangement of the first sensor 3 and the processor 4 based on actual needs, which is not limited in the present disclosure.

The first sensor 3 is configured to sense a motion parameter of at least one part of a body of the user in a case that the at least one part of the body of the user moves. The first sensor 3 transmits the sensed motion parameter to the processor 4. During a specific implementation process, the motion parameter includes but not limited to an angular velocity, a linear velocity, a direction, a central angle and acceleration. The first sensor 3 may be a nine-axis gravity sensor, a gyroscope or an angular velocity measurement instrument, for example, which is not limited in the present disclosure.

The processor 4 is configured to determine a motion state of the at least one part of the body of the user based on the motion parameter. For example, the processor 4 determines whether the motion of the at least one part of the body is finished based on the angular velocity and the linear velocity in the motion parameter; or determines whether the user rotates a wrist or shakes an arm based on an angular velocity in the motion parameter, which is not limited in the present disclosure. Furthermore, the processor 4 adjusts a display mode of the display 2 based on the motion state according to a first adjusting strategy, such that the user determines that a motion of the at least one part of the body is obtained by the electronic device.

In a case that the user wears the electronic device on the at least one part of the body and moves the at least one part of the body, for example, the user rotates a wrist on which the electronic device is worn or the user moves the arm on which the electronic device is worn from a left side of the body to a right side of the body, if the user sees that a display mode of the display 2 is adjusted, the user may determine that the motion of the body of the user is obtained by the electronic device and the motion is valid, and then the user continues moving the at least one part of the body. Alternatively, in a case that the user sees that a display mode of the display is not adjusted when the user moves the at least one part of the body, the user may determine that the motion of the body of the user is not obtained by the electronic device and the motion is invalid, the user moves the at least one part of the body again in a timely manner, thereby avoiding the invalid motion made continuously by the user.

Specific implementation ways for the processor 4 adjusting a display mode according to the first adjusting strategy are described in detail below. During a specific implementation process, there are multiple implementation ways, and three implementation ways are introduced in the present disclosure.

First Implementation Way

In the first implementation way, the electronic device according to the embodiment of the present disclosure may further include a second sensor. The second sensor may be arranged on the maintaining body 1 or the display 2, which is not limited in the present disclosure. The second sensor is connected to the processor 4 and configured to sense a visual field parameter of the user. The processor 4 is configured to determine a visual field range of the user based on the visual field parameter and adjust a display mode of a first display region based on the motion state and the visual field range according to the first adjusting strategy.

Specifically, the second sensor may be cameras arranged at multiple different positions on the maintaining body 1, and the visual field parameter is an acquired image. Furthermore, the processor 4 identifies an eye feature in each image. If the eye feature is identified in one image, an acquisition range of cameras acquiring the one image is a part of the visual field range. In a case that all the images are identified, the acquisition range of all the cameras corresponding to the image in which the eye feature is identified is taken as the visual field range. The processor 4 determines the visual field range based on the visual field parameter.

Alternatively, the second sensor may be a micro light-sensitive sensor arranged in each pixel point of the display 2. The micro light-sensitive sensor can sense the sight of the user, and the processor 4 determines whether the sight of the eye of the user is towards the micro light-sensitive sensor, that is, whether the sight of the eye of the user is towards the pixel point where the micro light-sensitive sensor is located. Hence, each pixel point of the display 2 can sense the sight while emitting a light. Furthermore, the micro light-sensitive sensor transmits the sensed sight to the processor 4. The processor 4 analyzes the sight sensed by each micro light-sensitive sensor to determine whether the sight of the user is towards the pixel point. Finally, illumination spaces of all the pixel points which the sight is towards are taken as the visual field range.

For example, it is assumed that the display 2 has 10000 pixel points and the processor 4 determines that the sight of the user is towards 3000 pixel points among the 10000 pixel points based on the sight sensed by 10000 micro light-sensitive sensors, the visual field range is a range in which the 3000 pixel points can be seen, i.e., an illumination space of the 3000 pixel points.

Subsequently, the processor 4 adjusts a display mode of a first display region based on the motion state and the visual field range according to a first adjusting strategy. In the embodiment of the present disclosure, the display 2 includes at least two display regions, and the first display region is a display region in the visual field range in a case that at least one part of a body of the user moves.

Figure 4:
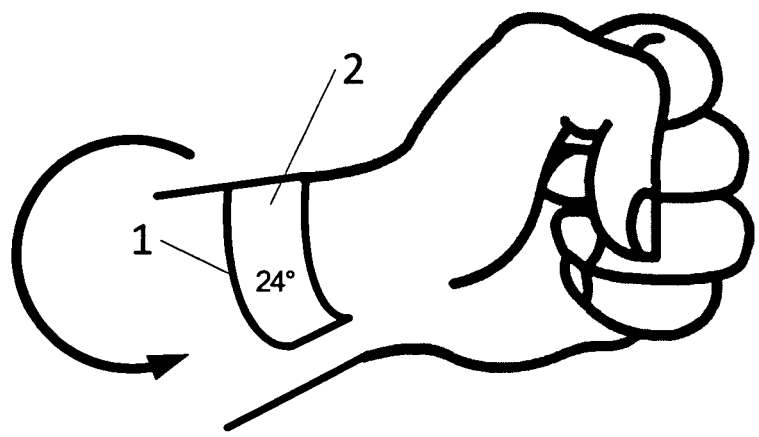
FIG. 4 is a schematic diagram of a display region and a display content before a display mode is adjusted according to an embodiment of the present disclosure.
Figure 5:
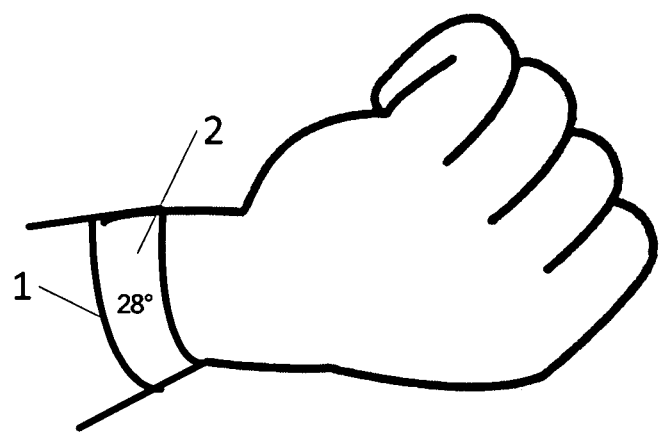
FIG. 5 is a schematic diagram of a display region and a display content after a display mode is adjusted according to an embodiment of the present disclosure.
Figure 6:
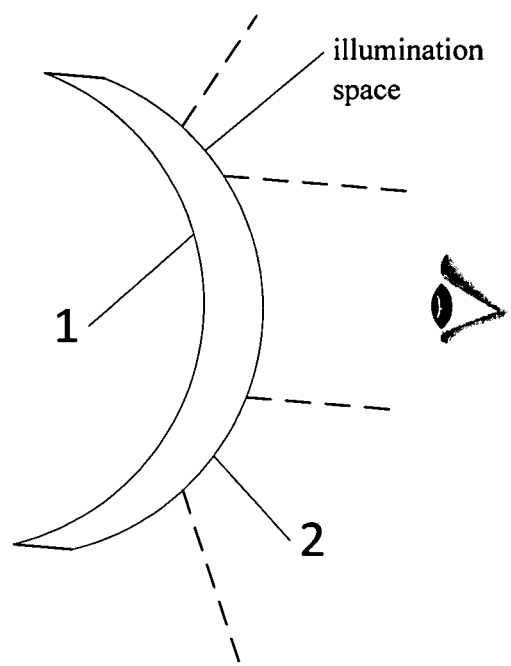
FIG. 6 is a side view of a display being in a curved posture and a schematic diagram of an illumination space according to an embodiment of the present disclosure.
Figure 7:
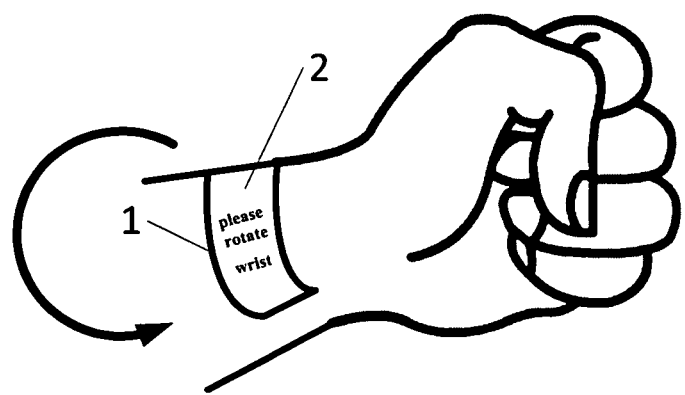
FIG. 7 is a schematic diagram of a display region and a display content before a display mode is adjusted according to an embodiment of the present disclosure.
Figure 8:
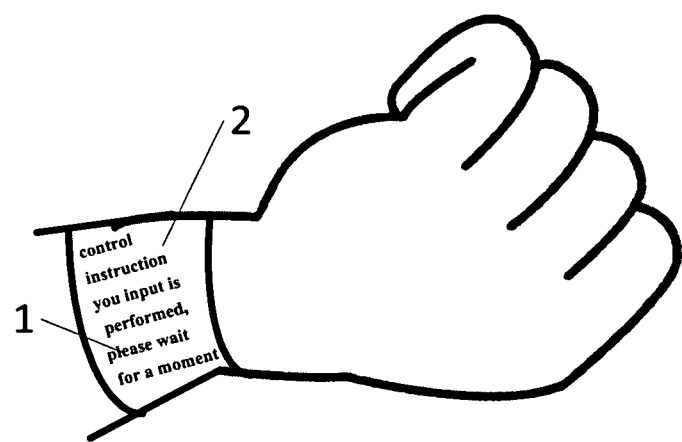
FIG. 8 is a schematic diagram of a display region and a display content after a display mode is adjusted according to an embodiment of the present disclosure.

For example, in a case that the user wears an electronic device shown in FIG. 2 on a wrist and the wrist is rotated from a position shown in FIG. 4 to a position shown in FIG. 5, where an arrow in FIG. 4 indicates a rotating direction. The visual field range after the wrist is rotated is shown in FIG. 6, and the first display region is a display region in the visual field range after the wrist moves, as shown in FIG. 5.

In the embodiment of the present disclosure, the first adjusting strategy may include multiple adjusting strategies, and accordingly the display mode of the first display region may be adjusted according to different first adjusting strategies. Several of the multiple first adjusting strategies are described hereinafter, and the first adjusting strategy includes but not limited several cases as follows during a specific implementation process.

First Case

The first adjusting strategy is to change a text prompt. In a case that a motion of the at least one part of the body is obtained by the electronic device, the electronic device changes the text prompt, and the user may determine that the motion of the user is valid in a case that the user sees the text prompt in a first display region in the visual field range. For example, it is assumed that a display region seen by the user before the user rotates the wrist is shown as FIG. 7, and the texts "please rotate wrist" are displayed in the display region shown in FIG. 7. The user starts to rotate the wrist in a direction shown in FIG. 7 to a position shown in FIG. 8. The processor 4 determines that the wrist of the user is rotated based on the motion parameter sensed by the first sensor 3 and the visual field parameter sensed by a second sensor, and the first display region in the visual field range is the display region shown in FIG. 8. Hence, the processor 4 changes the text prompt into "control instruction you input is performed, please wait for a moment".

Second Case

Figure 9:
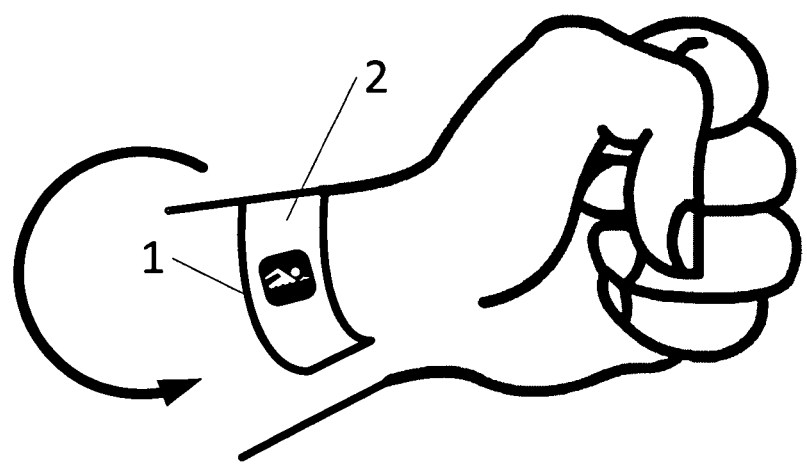
FIG. 9 is a schematic diagram of a display region and a display content before a display mode is adjusted according to an embodiment of the present disclosure.
Figure 10:
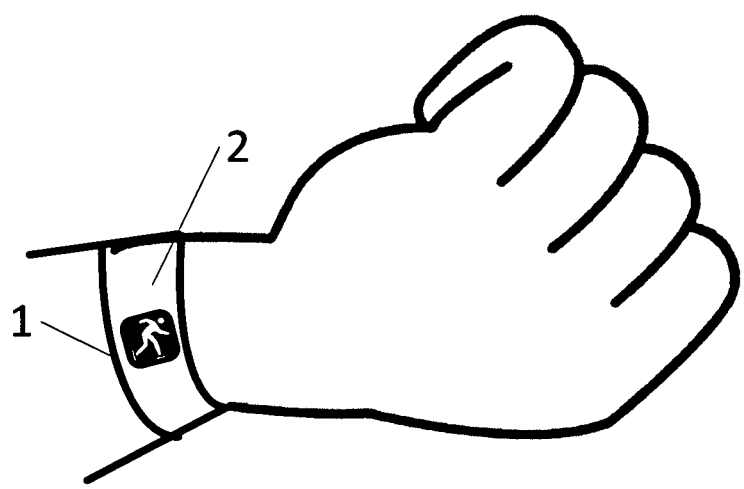
FIG. 10 is a schematic diagram of a display region and a display content after a display mode is adjusted according to an embodiment of the present disclosure.

The first adjusting strategy is to switch a display picture. In a case that a motion of the at least one part of the body is obtained by the electronic device, the display picture is switched, and the user may determine the motion of the user is valid in a case that the user sees the display picture in the first display region in the visual field range. For example, it is assumed that a display region and a display picture seen by the user before the user rotates the wrist are shown in FIG. 9. The user starts to rotate the wrist in a direction as shown in FIG. 9 to a position shown in FIG. 10. The processor 4 determines that the wrist of the user is rotated based on the motion parameter sensed by the first sensor 3 and the visual field parameter sensed by the second sensor, and the first display region in the visual field range is the display region shown in FIG. 10. Hence, the processor 2 switches the display picture to a display picture shown in FIG. 10.

More examples are not listed one by one herein. During a specific implementation process, those skilled in the art may select the adjusting strategy based on actual needs, which is not limited in the present disclosure.

In the first implementation way, the display mode of the first display region which the user can see is adjusted to prompt the user that a motion of the at least one part of the body is obtained by the electronic device. Hence, the user can determine that the motion of the user is valid, as long as the user can see a change of the display mode of the first display region.

Second Implementation Way

In a second implementation way, besides a maintaining body 1, a display 2, a first sensor 3 and a processor 4, the electronic device further includes a second sensor. The second sensor is described in detail in the first implementation way, which is not described herein.

In the embodiments of the present disclosure, a display region in the visual field range before the at least one part of the body moves is taken as a second display region In a case that the second display region is in the visual field range, the first display region is outside the visual field range. In other words, the user can see the second display region rather than the first display region before the at least one part of the body moves. In a case that the at least one part of the body of the user moves, the second display region moves outside of the visual field range and the first display region moves into the visual field range. Hence, the user sees the first display region rather than the second display region after the at least one part of the body moves.

In the second implementation way, the processor 4 determines that the display region in the visual field range is switched from the second display region to the first display region based on the visual field range.

Furthermore, the process 4 adjusts, based on the motion state, a second display content in the second display region to obtain a first display content, and display the first display content in the first display region. For example, a displayed number is amplified based on the motion direction or the displayed picture is switched based on the motion speed, which is not limited in the present disclosure.

The above example is used again. A visual field range of the user at a time instant T1 is shown in FIG. 3 and the second display content displayed in the second display region is shown in FIG. 4. As the user rotates the wrist, the second display region gradually moves outside the visual field range, while the first display region gradually moves into the visual field range. At a time instant T2, the display region in the visual field range is switched from the second display region to the first display region, and the user can only see the first display region. Based on an angular velocity and a central angle of a rotation of the wrist of the user, the processor 4 determines that a temperature value in the second display content is to be adjusted from 24 to 28, to obtain the first display content. Hence, in a case that the user sees the first display region, the user can see the first display content shown in FIG. 5.

Furthermore, since the user cannot see the second display region, the processor 4 controls the second display region to be in a no-display state, so as to reduce the power consumption of the device.

Similarly, if the user continues moving, the processor 4 can determine that the first display region is switched to be other regions based on the visual field range. In other words, the processor 4 determines the current display region in the visual field range in a real-time manner. In the second implementation way, the processor 4 adjusts the display region for displaying in a real-time manner, such that the user sees that the display content on the display moves as the at least one part of the body moves. Hence, the user can determine that the motion of the user is valid, as long as the user sees that the display content moves and changes. Furthermore, as the at least one part of the body moves, the second display region gradually moves outside the visual field range, and the user cannot see the second display content. In the embodiment of the present disclosure, the first display content is displayed in the first display region in the visual field range, such that the user can see the first display content and controls the motion of the at least one part of the body accurately, for example, a motion direction, a motion angle or end time of the motion.

Third Implementation Way

In the third implementation way, the processor 4 is configured to adjust a display mode of at least two display regions based on the motion state, such that the user determines, based on a display mode of any of the at least two display regions in the visual field range, that a motion of at least one part of the body is obtained by the electronic device.

In the third implementation way, the processor 4 adjusts the display mode of all the display regions on the display 2 integrally based on the motion state. Hence, as the at least one part of the body moves, the user can see that the display mode of a display region is adjusted, no mater which display region is in the visual field range.

In the embodiment of the present disclosure, the display mode of the at least two display regions may be adjusted in many ways. During a specific implementation process, the adjusting way includes but not limited the following two ways.

First Way

A display color of the at least two display regions is adjusted. For example, before the wrist is rotated, a white color is displayed in the at least two display regions; in a case that the wrist is rotated from a position shown in FIG. 4 to a position shown in FIG. 5, the processor 4 adjusts the display color of the at least two display regions to be a gray color. Hence, no matter which display region the user sees, the user can determine that the motion of the user is valid, as long as the user sees that the display color of the display 2 changes.

Second Way

Figure 11:
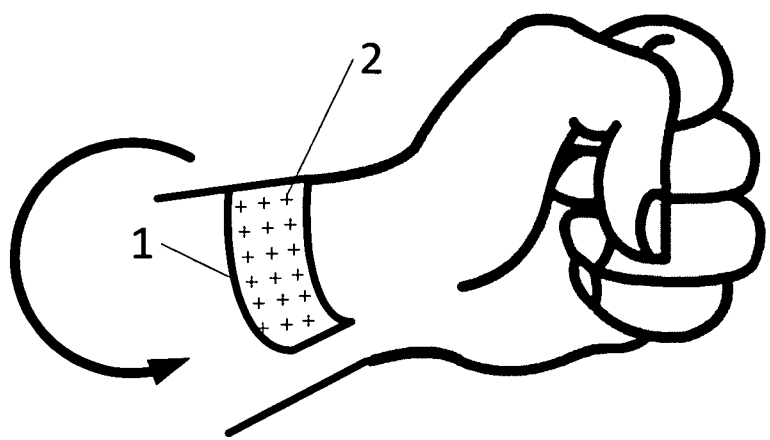
FIG. 11 is a schematic diagram of a display region and a display content before a display mode is adjusted according to an embodiment of the present disclosure.
Figure 12:
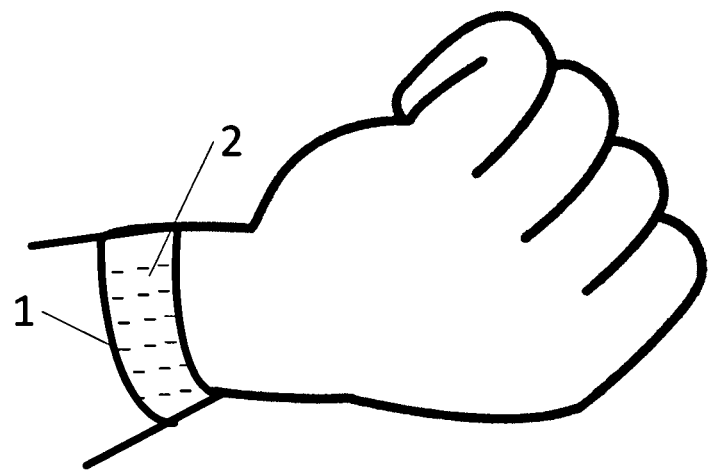
FIG. 12 is a schematic diagram of a display region and a display content after a display mode is adjusted according to an embodiment of the present disclosure.

A display symbol of the at least two display regions is switched. In the second adjusting way, all the display regions of the display 2 display multiple same display symbols, and the processor 4 switches the display symbol based on the motion state. For example, before the wrist is rotated, the display symbol in the at least two display regions is "+" as shown in FIG. 11. In a case that the wrist is rotated to a position shown in FIG. 12 in a direction shown in FIG. 11, the processor 4 switches the display symbol in the at least two display regions into "−", as shown in FIG. 12. In addition, in a case that the wrist is rotated in a direction opposite to the direction shown in FIG. 11, the processor 4 switches the display symbol in the at least two display regions into "o". In a case that the user rotates the wrist in the direction shown in FIG. 11, no matter which display region the user sees, the user can determine that the motion of the user is valid and the motion direction of the user is correct, as long as the user sees that the display symbol in the display region is changed into "−".

Furthermore, the first implementation way and the third implementation way may be used to the electronic device simultaneously, that is, the display mode of the whole display region is adjusted while the content is displayed in the first display region. Alternatively, the second implementation way and the third implementation way may be used to the electronic device simultaneously. For example, a temperature of 24 degrees is displayed in the second display region and a white color is displayed in other display regions before the wrist is rotated, and a temperature of 28 degrees is displayed in the first display region and a gray color is displayed in other display regions after the wrist is rotated. Those skilled in the art may set the implementation way for the electronic device based on actual needs, which is not limited in the present disclosure.

During a specific implementation process, those skilled in the art may select one of the above three implementation ways based on actual needs, which is not limited in the present disclosure.

Furthermore, in a case that the processor 4 determines a motion state based on the motion parameter, the processor 4 generates a control instruction based on the motion state.

Specifically, the control instruction is used to control the electronic device itself or another electronic device. In a case that the control instruction is used to control the electronic device, the processor 4 performs a control operation in response to the control instruction. In a case that the control instruction is used to control another electronic device, the control instruction is transmitted to another electronic device to be controlled via a communicator of the electronic device, such as a radio frequency unit, a wireless router or a near field communication module.

During a specific implementation process, in a case that the motion state is determined by the processor 4, the processor 4 may generate a control instruction and then adjusts a display mode; the processor 4 may adjust the display mode and then generates the control instruction; or, the processor 4 may generate the control instruction and adjust the display mode simultaneously. Those skilled in the art may set the specific implementation way based on actual needs, which is not limited in the present disclosure.

For example, it is assumed that the control instruction is a control instruction for controlling a mode of the electronic device to be switched from a flight mode to a common mode. In a case that the user needs to switch the flight mode into the common mode, the user rotates the wrist from a position shown in FIG. 4 to a position shown in FIG. 5. The first sensor 3 senses a motion parameter, and the processor 4 determines that the wrist of the user is rotated and generates a control instruction for switching the flight mode into the common node. In addition, in order to prompt the user that the motion of the wrist is obtained by the electronic device, the processor 4 adjusts the display mode of the display 2. For example, the display color of the at least two display regions is adjusted from a white color into a gray color, so as to prompt the user that the motion of the wrist is obtained by the electronic device and the display mode of the electronic device is switched into the common mode.

For example, it is assumed that the control instruction is a control instruction for adjusting a temperature of an air conditioner. In order to adjust the temperature of the air conditioner using the electronic device, the user rotates the wrist from a position shown in FIG. 4 to a position shown in FIG. 5. The first sensor 3 senses the motion parameter and the processor 4 determines that the wrist of the user is rotated. In addition, in order to prompt the user that the motion of the wrist is obtained by the electronic device, the processor 4 adjusts the display mode of the display 2. For example, in the second implementation way, a temperature is displayed in the first display region based on the angular velocity and the central angle. Hence, the user can see the temperature all the time while rotating the wrist. In addition, as the wrist of the user is rotated, the user sees a gradual change of the temperature, and determines that the control of the air conditioner is valid and determines whether to stop rotating the wrist based on the temperature displayed currently. Furthermore, the electronic device determines that a direction of the angular velocity is a direction in which the temperature is raised and a temperature value corresponding to the rotated central angle is 4 degrees, and the processor 4 generates a control instruction for controlling the temperature of the air conditioner to be raised by 4 degrees. In addition, the electronic device transmits the control instruction to the air conditioner via a wireless router.

Therefore, in a case that the user needs to control the electronic device or another electronic device by moving at least one part of the body on which the electronic device is worn, the electronic device adjusts the display mode to intelligently prompt the user regarding whether the control from the user is valid, thereby facilitating the user to determine whether to perform control again in a timely manner.

Hereinafter the maintaining body 1 according to the embodiment of the present disclosure is described in detail.

The maintaining body 1 has at least a maintained state, and the maintaining body 1 can function as at least one portion of a ring or at least one portion of an approximate ring meeting a first preset condition. The ring or the approximate ring can surround a columnar object meeting a second preset condition.

Figure 13A:
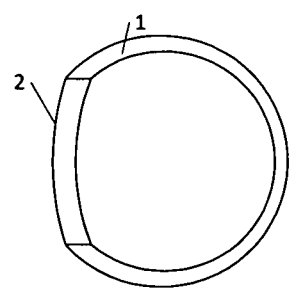
FIG. 13a to FIG. 13d are schematic structural diagrams of a maintaining body and schematic diagrams showing a connecting mode between the maintaining body and a display according to embodiments of the present disclosure.

In a case that the maintaining body 1 includes only one portion and the maintaining body 1 is connected to a first end and a second end of the display 2, a ring is formed with the maintaining body 1 itself, as shown in FIG. 13*a*.

Figure 13B:
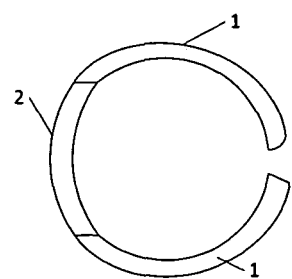
Figure 13C:
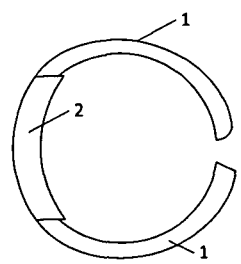
Figure 13D:
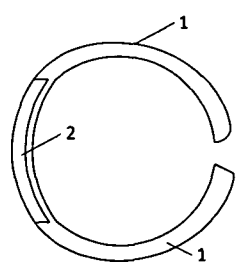

In a case that the maintaining body 1 includes two portions, a first portion is connected to the first end of the display 2 and a second portion is connected to the second end of the display 2, as shown in FIG. 13*b*. Alternatively, in a case that the display 2 is sheathed on the maintaining body 1 as shown in FIG. 13*c* or arranged on a surface of the maintaining body 1 as shown in FIG. 13*d*, and an approximate ring is formed with the maintaining body 1 itself. In a case that the electronic device is in a maintained state, the first portion and the second portion are two portions of the approximate ring. The approximate ring meets the first preset condition, that is, a distance between the first portion and the second portion is less than a caliber of a part of the body on which the electronic device is worn, for example a wrist, and the wrist is regarded as a columnar object. The columnar object meets the second preset condition, that is, a caliber of the columnar object is greater than a caliber of the ring, and diameters of two ends of the columnar object is less than a diameter of the ring in a case that the electronic device is maintained at a specified position or a specified height of the columnar object.

In the embodiment of the present disclosure, the first sensor 3 senses a motion parameter, i.e., a parameter for the rotation of the electronic device around an axis of the ring or an approximate axis of the approximate ring.

Specifically, the motion of the at least one part of the body refers to the at least one part of the body rotating around an axis of the ring formed with the maintaining body 1 or an approximate axis of the approximate ring formed with the maintaining body 1, and the first sensor 3 senses a parameter for the rotation of the electronic device around the axis or the approximate axis, for example, a linear velocity, an angular velocity or a central angle, which is not limited in the present disclosure.

From the above description, in a case that the user controls the electronic device or other electronic devices by rotating the at least one part of the body around the axis or the approximate axis, the rotation of the at least one part of the body seems like be adjusted via a rotating button, therefore, in the embodiment of the present disclosure, a display content in the display 2 is adjusted, such that the user determines that the rotation of the user is valid and accurately controls the rotation of the at least one part of the body based on the display content. For example, the user can determine whether the rotation direction is correct and a rotation angle is sufficient by observing the temperature displayed on the display 2.

Furthermore, in the embodiment of the present disclosure, the maintaining body 1 is configured to control the electronic device to be in a maintained state or a non-maintained state, and a state of the electronic device can be switched between the maintained state and the non-maintained state. In a case that the electronic device is in the non-maintained state, a relative position relationship between the electronic device and at least one part of the body of the user is not maintained; or in a case that the electronic device is in the maintained state, the maintaining body 1 maintains the relative position relationship between the electronic device and the at least one part of the body of the user.

Many ways may be used to switch the state of the electronic device between the maintained state and the non-maintained state.

For example, in a case that the maintaining body 1 is connected to the display 2 as shown in FIG. 13*a*, a material of the maintaining body 1 is lightweight elastic material. In a case that the maintaining body 1 is connected to the display 2 as shown in FIG. 13*b* to FIG. 13*d*, connection structures cooperating with each other are provided on the first portion and the second portion, such as a pin buckle, a fold-over clasp, a fold-over safe clasp or a butterfly clasp. In a case that the first portion is connected to the second portion, the maintaining body 1 can maintain a relative position relationship between the electronic device and at least one part of the body, and the electronic device is in a maintained state. In a case that the first portion is disconnected from the second portion, the maintaining body 1 cannot maintain the relative position relationship between the electronic device and the at least one part of the body, and the electronic device is in a non-maintained state. Hence, a state of the electronic device is switched between the maintained state and the non-maintained state by connecting or disconnecting the first portion and the second portion.

Alternatively, the state of the electronic device is switched between the maintained-state and the non-maintained state by the following two implementation ways.

Figure 14:
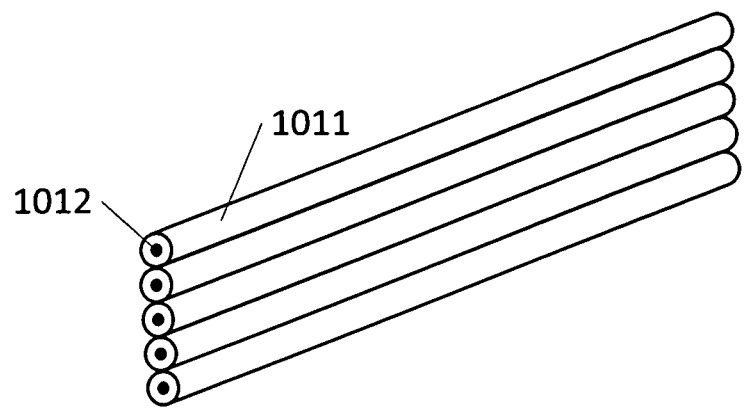
FIG. 14 is a schematic structural diagram of a flexible bendable structure according to an embodiment of the present disclosure.

In order to switch the state of the electronic device between the maintained state and the non-maintained state, the maintaining body 1 includes a flexible bendable structure. As shown in FIG. 14, the flexible bendable structure includes multiple rotatable parts 1011.

Each of the multiple rotatable parts 1011 has a rotation axis 1012, and the rotatable part 1011 can rotate around its rotation axis 1012.

Specifically, in the embodiment of the present disclosure, the number of the rotatable parts 1011 is greater than or equal to 3. During a specific implementation process, those skilled in the art may set the number of the rotatable parts based on actual needs, which is not limited in the present disclosure.

Rotation axes 1012 of the multiple rotatable parts 1011 are parallel with each other. In a case that a component of a force applied to one rotatable part 1011 in a direction perpendicular to a rotation axis 1012 of the rotatable part 1011 and tangent to an external surface of the rotatable part 1011 meets a second preset condition, the rotatable part 1011 can rotate around its rotation axis 1012. In the embodiment of the present disclosure, the second preset condition is that the component of the force is greater than a sum of a maximum static friction between the rotatable part 1011 and its rotation axis 1012 and a friction between two adjacent rotatable parts 1011. In the embodiment of the present disclosure, the force applied to the rotatable part 1011 may be a force applied by the user or a force delivered from other rotatable parts 1011. That is, one rotatable part 1011 may rotate under the force applied by the user or may be driven by other rotatable parts 1011, which is not limited in the present disclosure. During a specific implementation process, the sum of the maximum static friction between the rotatable part 1011 and its rotation axis 1012 and the friction between two adjacent rotatable parts 1011 are related to a manufacturing material and a manufacturing process of the multiple rotatable parts 1011.

Furthermore, in the embodiment of the present disclosure, each rotatable part 1011 contacts with two adjacent rotatable parts 1011. Hence, in a case that one rotatable part 1011 rotates, two adjacent rotatable parts or more rotatable parts are driven to rotate, and thus a state of the maintaining body 1 is switched between the maintained state and the non-maintained state.

Furthermore, in order to maintain a state of the maintaining body 1 in a case that the external force is removed or the external force does not meet the second preset condition, a contact between each rotatable part 1011 and its two adjacent rotatable parts 1011 is a damping contact. Therefore, the multiple rotatable parts 1011 maintain stable, and the state of the maintaining body 1 is maintained.

Figure 15:
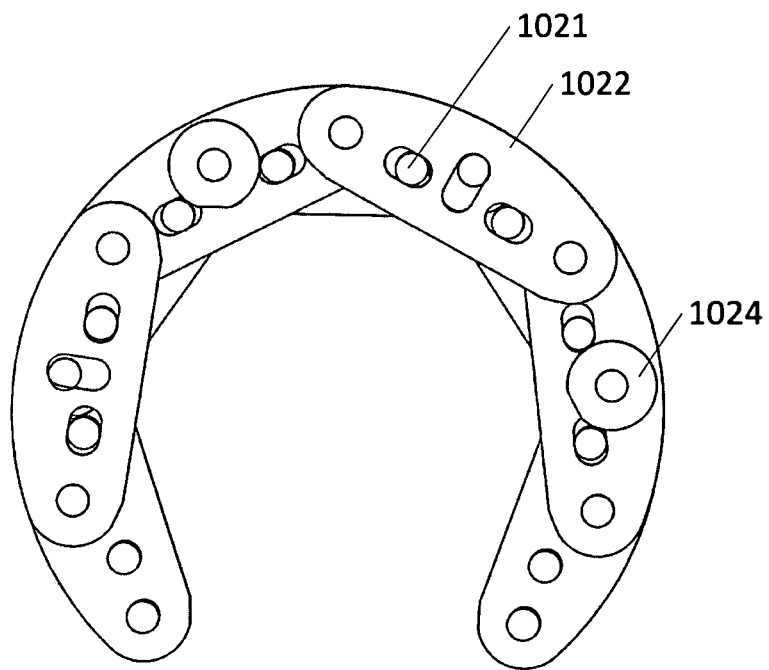
FIG. 15 is a schematic structural diagram of a flexible bendable structure according to an embodiment of the present disclosure.
Figure 16:
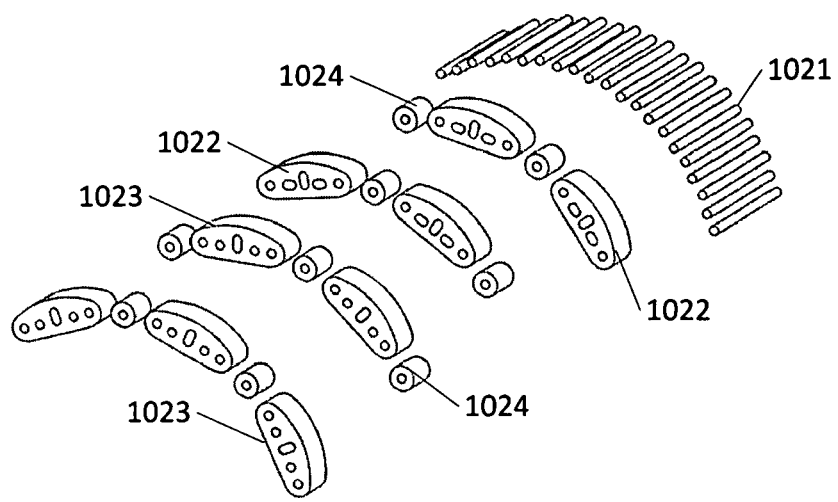
FIG. 16 is an exploded diagram of a flexible bendable structure according to an embodiment of the present disclosure.

Alternatively, FIG. 15 and FIG. 16 show other implementation ways of the flexible bendable structure. Specifically, the flexible bendable structure includes multiple axes 1021, a first connection member 1022, a second connection member 1023 and a supporting member 1024.

Specifically, the number of the axes 1021 is greater than or equal to 21. In a case that the 21 axes are curved flexibly, a state of the maintaining body 1 can change, as shown in FIG. 15. Those skilled in the art may select the number of the axes based on actual needs, for example 84 or 105, which is not limited in the present disclosure. For the convenience of description, it is assumed the number of the axes is 21 as an example hereinafter. As shown in FIG. 16, it is assumed that the axes are sequentially a first axis, a second axis, . . . , and a 21-th axis from top to bottom. The number of the first connection members 1022, the number of the second connection members 1023 and the number of the supporting members 1024 are related to the number of the axes. During a specific implementation process, a connection way described below is repeated periodically.

Figure 17A:
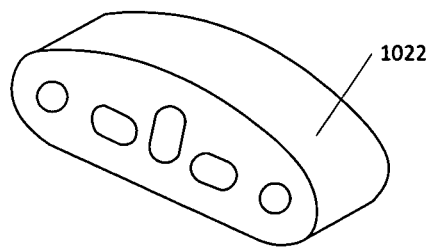
FIG. 17a a schematic diagram of a first connection member of the flexible bendable structure shown in FIG. 15 and FIG. 16.

As shown in FIG. 17a, 5 through holes are provided on the first connection member 1022, 5 axes may pass through the 5 through holes respectively, and there are 4 first connection members 1022 in each period. The 3-th axis to the 7-th axis pass through the 1-th first connection member 1022, the 7-th axis to the 11-th axis pass through the 2-th first connection member 1022, the 11-th axis to the 15-th axis pass through the 3-th first connection member 1022, and the 15-th axis to the 19-th axis pass through the 4-th first connection member 1022. The 5-th axis, the 9-th axis, the 12-th axis and the 17-th axis can rotate in respective through holes and slide in a first direction. The 4-th axis, the 6-th axis, the 8-th axis, the 10-th axis, the 12-th axis, the 14-th axis, the 17-th axis and the 18-th axis can rotate in respective through holes and slide in a second direction. The first direction is perpendicular to the second direction. Other axes can only rotate in respective through holes and cannot slide.

Figure 17B:
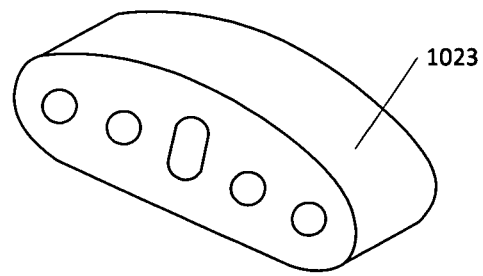
FIG. 17b is a schematic diagram of a second connection member of the flexile bendable structure shown in FIG. 15 and FIG. 16.

As shown in FIG. 17b, 5 through holes are provided on the second connection member 1023, 5 axes may pass through the 5 through holes respectively, and there are 5 second connection members 1023 in each period. The 1-th axis to the 5-th axis pass through the 1-th second connection member 1023, the 5-th axis to the 9-th axis pass through the 2-th second connection member 1023, the 9-th axis to the 13-th axis pass through the 3-th second connection member 1023, the 13-th axis to the 17-th axis pass through the 4-th second connection member 1023 and the 17-th axis to the 21-th axis pass through the 5-th second connection member 1023. The 3-th axis, the 7-th axis, the 11-th axis, the 15-th axis and the 19-th axis can rotate in respective through holes and slide in a first direction. Other axes can only rotate in respective through holes and cannot slide.

The supporting member 1024 is a hollow cylinder of which an inner diameter cooperates with an external diameter of the axis 1021, there are 9 supporting members 1024 in each period, and the supporting member 1024 is sheathed on the axis 1021 passing through the through hole of the first connection member 1022 and/or the second connection member 1023, as shown in FIG. 16.

Figure 18:
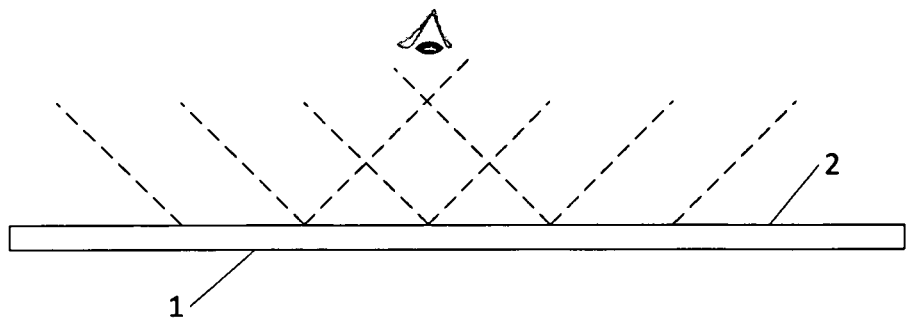
FIG. 18 is a side view of a display being in a flat posture and a schematic diagram of an illumination space according to an embodiment of the present disclosure.

With the above structure, in a case that an external force is applied to the maintaining body 1, the multiple axes 1021 rotate in the through holes of the first connection members 1022 and the second connection members 1023 and slide in the first direction or the second direction, such that the flexible bendable structure is curved flexibly and the electronic device is controlled to be in a maintained state, and the electronic device is maintained on at least one part of the body of the user. In a case that the flexible bendable structure is not curved flexibly, the maintaining body 1 is flat, as shown in FIG. 18. In this case, the maintaining body 1 cannot maintain a relative position relationship between the electronic device and the at least one part of the body, and the state of the electronic device is switched to a non-maintained state.

Furthermore, the display 2 according to the embodiment of the present disclosure is a flexible screen display. In a case that the electronic device is in the non-maintained state, the display 2 is in a flat posture different from the curved posture, as shown in FIG. 18. In a case that the display 2 is in the flat posture, illumination spaces for the display regions overlap.

Specifically, an illumination space for each display region overlaps with an illumination space for one or more adjacent display region in at least two display regions. Hence, the user can see two or more display regions simultaneously in a case that an eye of the user is in the overlapped illumination space. In other words, in a case that the display 2 is in the curved posture, the user can see only one display region; in a case that the electronic device is in a non-maintained state and the display 2 is in the flat posture, the user can see two or more display regions simultaneously.

Furthermore, since the display 2 includes a flexible screen, the gesture of the display 2 may be switched based on the state of the flexible bendable structure. Specifically, in a case that the flexible bendable structure is curved, the flexible screen is curved as the maintaining body 1 is curved, and the display 2 is in a curved posture. In a case that the flexible bendable structure is not curved, the flexible screen is not curved but is flat, and the display 2 is in a flat posture. Hence, the user may switch a gesture of the display 2 between the curved posture and the flat posture by bending the maintaining body 1.

Figure 19:
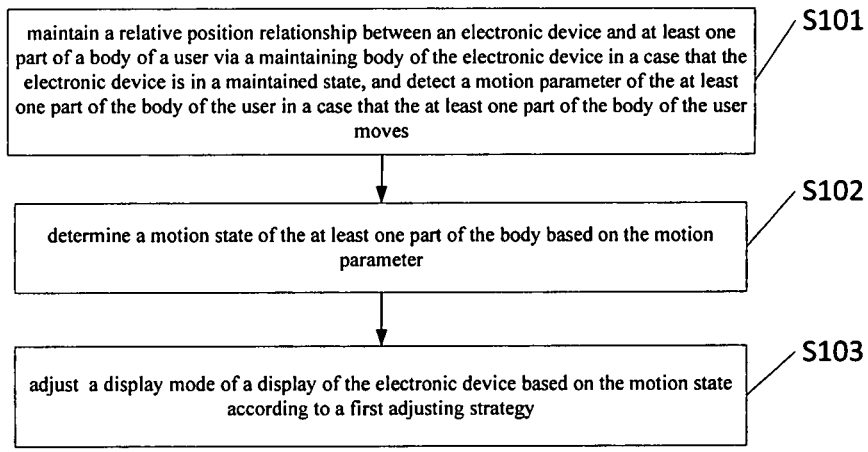
FIG. 19 is a flowchart of an information processing method according to an embodiment of the present disclosure.

An information processing method is provided according to a second aspect of the present disclosure. As shown in FIG. 19, the method includes step S101 to step S103.

In step S101, a relative position relationship between an electronic device and at least one part of a body of a user is maintained via a maintaining body of the electronic device in a case that the electronic device is in a maintained state, and a motion parameter of the at least one part is sensed in a case that the at least one part of the body of the user moves.

In step 102, a motion state of the at least one part is determined based on the motion parameter.

In step 103, a display mode of a display of the electronic device is adjusted based on the motion state according to a first adjusting strategy.

Specifically, in the embodiment of the present disclosure, the implementation way for adjusting the display mode in step S103 includes but not limited to the three ways as follows.

First Way

Before step S103, the method further includes:
sensing a visual field parameter of a user.
Step 103 includes:
determining a visual field range of the user based on the visual field parameter; and
adjusting a display mode of a first display region based on the motion state and the visual field range according to a first adjusting strategy, where the first display region is a display region of the at least two display regions in the visual field range in a case that the at least one part of the body of the user moves.

Second Way

Before step S103, the method further includes:
sensing a visual field parameter of the user.

Step 103 includes:
determining, based on a visual field range, that a display region in the visual field range is switched from a second display region to the first display region, where the second display region is outside the visual field range in a case that the first display region is in the visual field range;
adjusting, based on the motion state, a second display content in the second display region to obtain a first display content; and
displaying the first display content in the first display region.

Third Way

Step S103 includes:
adjusting a display mode of at least two display regions based on the motion state, where the user determines, based on the display mode of any of the at least two display regions in the visual field range, that a motion of the at least one part of the body is obtained by the electronic device.

Furthermore, in the previous two implementation ways, the sensing a visual field parameter of the user includes:
sensing a parameter for the rotation of the electronic device around an axis of the ring or an approximate axis of the approximate ring, where the maintaining body can function as at least one portion of the ring or at least one portion of the approximate ring meeting a first preset condition, and the ring or the approximate ring can surround a columnar object meeting a second preset condition.

Furthermore, in the embodiment of the present disclosure, after step S102, the method may further include:
generating a control instruction based on the motion state, where the control instruction may be used to control the electronic device or the control instruction may be transmitted to another electronic device via a communicator connected to the processor.

Various changes and specific examples of the electronic device according to embodiments shown in FIG. 1 to FIG. 18 are applicable to the information processing method according to the embodiment. The implementation ways of the information processing method according to the embodiment may be known clearly by those skilled in the art based on the detailed description of the electronic device, which are not described herein for the simplicity of the specification.

Figure 20:
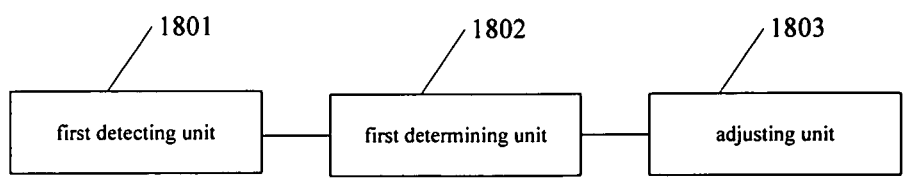
FIG. 20 is a schematic structural diagram of an electronic device according to an embodiment of the present disclosure.

An electronic device is further provided according to a second aspect of the present disclosure. As shown in FIG. 20, the electronic device includes a first sensing unit 1801, a first determining unit 1802 and an adjusting unit 1803.

The first sensing unit 1801 is configured to maintain a relative position relationship between the electronic device and at least one part of a body of a user in a case that the electronic device is in a maintained state, and sense a motion parameter of the at least one part of the body in a case that the at least one part of the body of the user moves.

The first determining unit 1802 is configured to determine a motion state of the at least one part of the body based on the motion parameter.

The adjusting unit 1803 is configured to adjust a display mode of a display of the electronic device based on the motion state according to a first adjusting strategy, and the user determines that a motion of the at least one part of the body is obtained by the electronic device.

The display is connected to a maintaining body and includes at least two display regions. Illumination spaces for the display regions do not overlap in a case that the display is in a curved posture.

Optionally, the electronic device may further include:
a second sensing unit configured to sense a visual field parameter of the user;

where the adjusting unit 1803 is configured to determine a visual field range of the user based on the visual field parameter; and adjust a display mode of a first display region based on the motion state and the visual field range according to a first adjusting strategy, where the display region is a display region of the at least two display regions in the visual field range in a case that the at least one part of the body of the user moves.

Optionally, the adjusting unit 1803 is configured to determine, based on the visual field range, that the display region in the visual field range is switched from a second display region to the first display region, where the second display region is outside the visual field range in a case that the first display region is in the visual field range; and adjust, based on the motion state, a second display content in the second display region to obtain a first display content; and display the first display content in the first display region.

Optionally, the adjusting unit 1803 is configured to adjust a display mode of the at least two display regions based on the motion state, and the user determines, based on the display mode of any of the at least two display regions in the visual field range, that a motion of the at least one part of the body is obtained by the electronic device.

Optionally, the second sensing unit is configured to sense a parameter for the rotation of the electronic device around an axis of the ring or an approximate axis of the approximate ring. The maintaining body can function as at least one portion of the ring or at least one portion of the approximate ring meeting a first preset condition, and the ring or the approximate ring can surround a columnar object meeting a second preset condition.

Optionally, the electronic device may further include:

an instruction generating unit configured to generate a control instruction based on a motion state of the at least one part in a case that the motion state is determined based on the motion parameter, where the control instruction may be used to control the electronic device or the control instruction may be transmitted to another electronic device via a communicator connected to the processor.

Various changes and specific examples of the electronic device according to embodiments shown in FIG. 1 to FIG. 18 are applicable to the information processing method according to the embodiment. The implementation ways of the information processing method according to the embodiment may be known clearly by those skilled in the art based on the detailed description of the electronic device, which are not described herein for the simplicity of the specification.

One or more technical solution described above in the embodiments of the present disclosure has one or more of the following technical effects.

In the technical solutions of the embodiments of the present disclosure, the electronic device includes a maintaining body, a display, a first sensor and a processor. The maintaining body is configured to maintain a relative position relationship between the electronic device and at least one part of a body of a user in a case that the electronic device is in a maintained state. The display is connected to the maintaining body and includes at least two display regions. Illumination space for the at least two display regions do not overlap in a case that the display is in a curved posture. The first sensor is configured to sense a motion parameter of the at least one part in a case that the at least one part of the body of the user moves. The processor is connected to the first sensor and the display, and configured to determine a motion state of the at least one part of the body based on the motion parameter, and adjust a display mode of the display based on the motion state according to a first adjusting strategy, and the user determines that a motion of the at least one part of the body is obtained by the electronic device. Therefore, in a case that the motion of the at least one part of the body of the user is obtained by the electronic device, the processor adjusts the display mode of the display according to the first adjusting strategy, and indicates to the user that the motion of the user is obtained by the electronic device. In a case the at least one part of the body of the user moves, the user can determine whether the motion of the user is obtained by the electronic device and determine whether the motion is valid by observing the display mode of the display, and thus the user continues moving or moves the at least one part of the body again in a timely manner.

It is to be understood by those skilled in the art that the embodiments of the present disclosure may be implemented as a method, a system or a computer program product. Hence, the present disclosure may be embodied as only hardware embodiments, only software embodiments or embodiments of a combination of software and hardware. In addition, the present disclosure may be embodied as a computer program product implemented on a computer available storage medium (including but not limited to a magnetic disk memory, CD-ROM, and an optical memory) containing computer available program codes.

The present disclosure is described by referring to flowcharts and/or block diagrams of methods, devices (systems) and computer program products according to the embodiments of the present disclosure. It should be understood that each flow and/or block in the flowcharts and/or block diagrams and a combination of flows and/or blocks in the flowcharts and/or block diagrams may be implemented by computer program instructions. Theses computer program instructions may be provided to a general-purpose computer, a dedicated computer, an embedded processor or processors of other programmable data processing devices to generate a machine language, such that the instructions executed by the computer or the processors of other programmable data processing devices generate a device for achieving functions specified in one or more flow in the flowcharts and/or one or more block in the block diagrams.

These computer program instructions may be stored in a computer readable memory which can guide the computer or other programmable data processing devices to work in a specified mode, such that the instructions stored in the computer readable memory generate a product including an instruction device, which achieves functions specified in one or more flow in the flowcharts and/or one or more blocks in the block diagrams.

These computer program instructions may be loaded to the computer or other programmable data processing devices, such that a series of operation steps are performed on the computer or other programmable devices to generate processing implemented by the computer, and hence the instructions executed on the computer or other programmable devices perform steps for achieving functions specified in one or more flow in the flowcharts and/or one or more block in the block diagrams.

Specifically, computer program instructions corresponding to an information processing method according to the embodiments of the present disclosure may be stored in a storage medium, for example, an optical disk, a hard disk or a USB flash disk. The computer program instruction stored in the storage medium and corresponding to the information processing method, when being read or executed by an electronic device, includes:

maintaining a relative position relationship between an electronic device and at least one part of a body of a user via a maintaining body of the electronic device in a case that the electronic device is in a maintained state, and sensing a motion parameter of the at least one part in a case that the at least one part of the body of the user moves;

determining a motion state of the at least one part of the body based on the motion parameter;

adjusting a display mode of a display of the electronic device based on the motion state according to a first adjusting strategy, where the user determines that a motion of the at least one part is obtained by the electronic device, where the display is connected to the maintaining body and includes at least two display regions; and illumination spaces for the at least two display regions do not overlap in a case that the display is in a curved posture.

Optionally, other computer program instructions are further stored in the storage medium and executed before the process of adjusting a display mode of a display of the electronic device based on the motion state according to a first adjusting strategy. The computer program instructions, when being executed, includes:

sensing a visual field parameter of the user;

where the computer instructions stored in the storage medium and corresponding to the process of adjusting a display mode of a display of the electronic device based on the motion state according to a first adjusting strategy, when being executed, includes:

determining a visual field range of the user based on the visual field parameter; and adjusting a display mode of a first display region based on the motion state and the visual field range according to the first adjusting strategy, where the first display region is a display region of the at least two display regions in the visual field range in a case that the at least one part of the body of the user moves.

Optionally, the computer program instructions stored in the storage medium and corresponding to the process of adjusting a display mode of a display of the electronic device based on the motion state according to a first adjusting strategy, when being executed, includes:

determining, based on the visual field range, that the display region in the visual field range is switched from a second display region to the first display region, where the second display region is outside the visual field range in a case that the first display region is in the visual field range;

adjusting, based on the motion state, a second display content in the second display region to obtain a first display content; and displaying the first display content in the first display region.

Optionally, the computer stored in the storage medium and corresponding to the process of adjusting a display mode of a display of the electronic device based on the motion state according to a first adjusting strategy, when being executed, includes:

adjusting a display mode of the at least two display regions based on the motion state, where the user determines, based on the display mode of any of the at least two display modes in the visual field range, that a motion of the at least one part of the body is obtained by the electronic device.

Optionally, the computer program instruction stored in the storage medium and corresponding to the process of sensing a visual field parameter of the user, when being executed, includes:

sensing a parameter for the rotation of the electronic device around an axis of the ring or an approximate axis of the approximate ring, where the maintaining body is capable of functioning as at least one portion of the ring or at least one portion of the approximate ring meeting a first preset condition, and the ring or the approximate ring is capable of surrounding a columnar object meeting a second preset condition.

Optionally, other computer instructions are stored in the storage medium and are executed after the process of determining a motion state of the at least one part based on the motion parameter. The computer instructions, when being executed, includes:

generating a control instruction based on the motion state, where the control instruction may be used to control the electronic device or the control instruction may be transmitted to another electronic device via a communicator connected to the processor.

Apparently, those skilled in the art can make various changes and variations of the disclosure without departing from the spirit and scope of the present disclosure. In this way, the present disclosure is intended to include the changes and variations which fall within the scope of claims of the present disclosure and the equivalents thereof.

The invention claimed is:

1. An electronic device, comprising:
   a maintaining body configured to maintain a relative position relationship between the electronic device and at least one part of a body of a user in a case that the electronic device is in a maintained state;
   a display connected to the maintaining body and comprising at least two display regions, wherein illumination spaces for the at least two display regions do not overlap in a case that the display is in a curved posture;
   a first sensor configured to sense a motion parameter of the at least one part of the body in a case that the at least one part of the body of the user moves; and
   a processor connected to the first sensor and the display, wherein the processor is configured to determine a motion state of the at least one part of the body based on the motion parameter and adjust a display mode of the display based on the motion state according to a first adjusting strategy, to make the user determine that the motion state of the at least one part of the body is obtained by the electronic device,
   wherein the processor is configured to adjust display modes of the at least two display regions based on the motion state, to make the user determine, based on a display mode of any of the at least two display regions in a visual field range, that the motion of the at least one part of the body is obtained by the electronic device, wherein the display mode comprises a text prompt, and/or a display picture, and/or a display symbol, display modes before adjusting are the same for both of the at least two display regions, display modes after adjusting are the same for both of the at least two display regions, and the display modes before adjusting for both of the at least two display regions are different from the display modes after adjusting for both of the at least two display regions.

2. The electronic device according to claim 1, wherein the maintaining body is capable of functioning as at least one portion of a ring or at least one portion of an approximate ring meeting a first preset condition, and the ring or the approximate ring is capable of surrounding a columnar object meeting a second preset condition.

3. The electronic device according to claim 2, wherein the first sensor is configured to sense a parameter for the rotation of the electronic device around an axis of the ring or an approximate axis of the approximate ring.

4. The electronic device according to claim 3, wherein the maintaining body is configured to control the electronic device to be in the maintained state or a non-maintained state, and a state of the electronic device is capable of being switched between the maintained state and the non-maintained state;
   in a case that the electronic device is in the non-maintained state, the relative position relationship between the electronic device and the at least one part of the body of the user is not maintained, the display is in a flat posture different from the curved posture, and the illumination spaces for the at least two display regions overlap; and
   a gesture of the display is capable of being switched between the curved posture and the flat posture.

5. An information processing method, comprising:
   maintaining a relative position relationship between an electronic device and at least one part of a body of a user via a maintaining body of the electronic device in a case that the electronic device is in a maintained state, and sensing a motion parameter of the at least one part of the body of the user in a case that the at least one part of the body of the user moves;
   determining a motion state of the at least one part of the body based on the motion parameter; and
   adjusting a display mode of a display of the electronic device based on the motion state according to a first adjusting strategy, wherein the user determines that a motion of the at least one part of the body is obtained by the electronic device,
   wherein the display is connected to the maintaining body and comprises at least two display regions; and illumination spaces for the at least two display regions do not overlap in a case that the display is in a curved posture, and
   wherein the adjusting the display mode of the display of the electronic device based on the motion state according to the first adjusting strategy includes:
   adjusting display modes of the at least two display regions based on the motion state, to make the user determine, based on a display mode of any of the at least two display regions in a visual field range, that the motion of the at least one part of the body is obtained by the electronic device, wherein the display mode comprises a text prompt, and/or a display picture, and/or a display symbol, display modes before adjusting are the same for both of the at least two display regions, display modes after adjusting are the same for both of the at least two display regions, and the display modes before adjusting for both of the at least two display regions are different from the display modes after adjusting for both of the at least two display regions.

6. The method according to claim 5, wherein the sensing a visual field parameter of the user comprises:
   sensing a parameter for the rotation of the electronic device around an axis of a ring or an approximate axis of an approximate ring, wherein the maintaining body is capable of functioning as at least one portion of the ring or at least one portion of the approximate ring meeting a first preset condition, and the ring or the approximate ring is capable of surrounding a columnar object meeting a second preset condition.

7. An electronic device, comprising:
   a first sensing unit configured to maintain a relative position relationship between the electronic device and at least one part of a body of a user in a case that the electronic device is in a maintained state, and sense a motion parameter of the at least one part of the body in a case that the at least one part of the body of the user moves;
   a first determining unit configured to determine a motion state of the at least one part of the body based on the motion parameter;
   an adjusting unit configured to adjust a display mode of a display of the electronic device based on the motion state according to a first adjusting strategy, to make the user determine that a motion of the at least one part of the body is obtained by the electronic device,
   wherein the display is connected to the first sensing unit and comprises at least two display regions; and illumination spaces for the at least two display regions that do not overlap in a case that the display is in a curved posture, and
   wherein the adjusting unit is further configured to adjust display modes of the at least two display regions based on the motion state, to make the user determine, based on a display mode of any of the at least two display regions in a visual field range, that the motion of the at least one part of the body is obtained by the electronic device, wherein the display mode includes a text prompt, and/or a display picture, and/or a display symbol, display modes before adjusting are the same for both of the at least two display regions, display modes after adjusting are the same for both of the at least two display regions, and the display modes before adjusting for both of the at least two display regions are different from the display modes after adjusting for both of the at least two display regions.

8. The electronic device according to claim 1, wherein the processor is further configured to generate a control instruction based on the motion state, and the control instruction is used to control the electronic device or the control instruction is transmitted to another electronic device via a communicator connected to the processor.

9. The method according to claim 5, wherein after the determining a motion state of the at least one part based on the motion parameter, the method further comprises:
   generating a control instruction based on the motion state, wherein the control instruction is used to control the electronic device or the control instruction is transmitted to another electronic device via a communicator.

\* \* \* \* \*